United States Patent
James et al.

(10) Patent No.: US 7,095,825 B2
(45) Date of Patent: Aug. 22, 2006

(54) MULTI-MEDIA TRANSACTIONS PRESENTATION BASED ON USER PHYSICAL CHARACTERISTIC

(75) Inventors: Eric James, Elgin, IL (US); David Funck, Wheaton, IL (US)

(73) Assignee: Rockwell Electronic Commerce Technologies, LLC, Wood Dale, IL (US)

( * ) Notice: Subject to any disclaimer, the term of this patent is extended or adjusted under 35 U.S.C. 154(b) by 333 days.

(21) Appl. No.: 10/675,316

(22) Filed: Sep. 30, 2003

(65) Prior Publication Data

US 2005/0069094 A1    Mar. 31, 2005

(51) Int. Cl.
*H04M 11/00* (2006.01)
(52) U.S. Cl. .................... 379/52; 379/265.12
(58) Field of Classification Search ............ 379/52, 379/265.02, 265.13, 93.15, 265.12
See application file for complete search history.

(56) References Cited

U.S. PATENT DOCUMENTS

2003/0174830 A1* 9/2003 Boyer et al. ........... 379/265.02
2005/0068940 A1* 3/2005 Saleh et al. ................ 370/352

* cited by examiner

*Primary Examiner*—Stella Woo
(74) *Attorney, Agent, or Firm*—Welsh & Katz, Ltd.

(57) ABSTRACT

The method and apparatus is for converting messages and responses between different formats in a communication system. The method may have in one embodiment the following steps: providing at least one plug-in that implements at least one message format conversion in the communication system; assigning the at least one plug-in to a handicapped agent; and activating the at least one plug-in for the respective handicapped agent for converting received messages in a first format to a second format and for converting responses in the second format to the first format. The apparatus implements the method.

20 Claims, 8 Drawing Sheets

MULTI-MEDIA TRANSACTIONS PRESENTATION BASED ON USER PHYSICAL CHARACTERISTICS

FIELD OF THE INVENTION

The field of the invention relates to communication systems and, in particular, to communication systems having automatic contact distribution systems.

BACKGROUND

Automatic contact or call distribution systems are known. Such systems are typically used, for example, as a means of distributing customer contacts such as telephone calls among a group of agents. Automatic contact distributors (also known as automatic call distributors or ACD's) may be, but not limited to, hardware and/or software systems with many possible configurations including distributed systems, integrated systems, systems based on one or more personal computers or servers, and the like.

Often an organization disseminates a single telephone number to its customers and to the public in general as a means of contacting the organization. The term "calls" refers not only to conventional telephone calls, but also to any customer contacts including but not limited to facsimile, e-mail, Internet communications such as web chat and VOIP (Voice Over Internet Protocol). As calls are directed to the organization from the public switch telephone network or other communication system, the automatic call distribution system directs the calls to its agents based upon some type of criteria. For example, where all agents are considered equal, the automatic call distributor may distribute the calls based upon which agent has been idle the longest. The agents that are operatively connected to the automatic call distributor may be live agents, and/or virtual agents. Typically, virtual agents are, for example, software routines and algorithms that are operatively connected and/or part of the automatic call distributor.

Automatic call distributors are often utilized in communications handling centers, such as telephone call centers, that forward incoming communications for processing by one of several associated call-handling agents. Such communications centers may be used to forward voice-over-internet protocol communications; electronic mail messages; facsimiles or the like, to associated handling agents.

Call centers, for example, are often used to dispatch emergency services, as telemarketing sales centers, as customer service centers, etc. to automatically distribute received calls. Each incoming call may have a number of handling requirements, depending on, for example, the nature of the call, the originating call area, and the language of the call. Agents, on the other hand, each have abilities to process calls having certain handling requirements. Typically, agents are able to process one or more call types. For example, agents may be trained to process certain call subject matters and certain call languages.

In known call centers, computerized automatic call distributors place incoming telephone calls, of a particular type, requiring defined skills, in queues of like calls. Appropriate agents have skills necessary to process calls in the queues, and are assigned to such queues. Agents are often assigned to multiple queues, reflective of their particular handling skills. Typically, this is done to increase the handling capacity of the center by making improved use of available communications handling resources.

Quite often, agents may handle calls related to one or more subject areas, and possess varied attributes that are relevant to all subject areas they are capable of handling. For example, a telephone call center agent may speak multiple languages, and may therefore be able to process telephone calls relating to a particular subject matter in all these languages. One simple approach used to deal with multiple agent attributes is to create and administer individual queues, each of which takes into account the subject matter and the attributes of the agent. This, however, is administratively very cumbersome.

Other known call centers use agent-skill indicators, associated with agents in order to connect calls. In such centers, a call is connected to an agent having an agent-skill indicator matching that of the call, within a group of agents. Agents, however, are typically only assignable to only one, and typically only a single agent-skill indicator is used to connect the call. Disadvantageously, such call centers do not use agent attributes across different groups. This may lead to an inefficient utilization of call center resources. Moreover, these communications handling centers do not allow for easy administration and re-assignment of agents to queues, while maintaining agent skill-sets.

One concern in designing an automatic call distributor system is ensuring that calls are efficiently routed to an agent, so as to minimize the amount of time that any particular call waits to be handled. One basic technique of minimizing on-hold time is to employ a first-in/first-out call handling technique. The first-in/first-out technique requires that calls be routed to the next available agent in the order in which the calls are received. However, in some automatic call distributor systems the agents are specialized in handling particular types of calls, so the first-in/first-out technique is not appropriate. For example in a product support department of a software facility, agents might be grouped according to specialized expertise, so that a first group is knowledgeable in word processing, a second group is knowledgeable in a database program, and a third group is knowledgeable in a spreadsheet program. Utilizing a first-in/first-out technique in such a situation is inappropriate, because a caller with a question regarding the word processing program may be routed to an agent having specialized knowledge regarding the database program or the spreadsheet program, rather than being routed to an agent with specialized knowledge in the word processing program.

The focus in the management of calls has been upon maximizing availability to customers, so as to achieve an acceptable profit margin in a competitive environment of customer service. Call management approaches that increase revenue may lead to savings for customers.

Most present-day call-distribution algorithms focus on being "fair" to callers and to agents. This fairness is reflected by the standard first-in, first-out call to most-idle-agent assignment algorithm. Skills-based routing improves upon this basic algorithm in that it allows each agent to be slotted into a number of categories based on the agent's skill types and levels.

Prior art systems typically cannot accommodate agents with disabilities/handicaps or allow them to function effectively in a transaction processing center environment. Such agents may have visual, auditory, and vocal disabilities, and perhaps disabilities involving manual dexterity.

Certain interfaces exist for some disabled individuals. For example, text-relay services are available, but such a service is very slow and relatively expensive. Braille printers also exist to translate text into Braille. However, such hardware is not currently integrated into a transaction processing system, and a total integrated solution is not available.

SUMMARY

One embodiment of the present invention is a method for converting messages and responses between different formats in a communication system. The method may include: providing at least one plug-in that implements at least one message format conversion in the communication system; assigning the at least one plug-in to a handicapped agent; and activating the at least one plug-in for the respective handicapped agent for converting received messages in a first format to a second format and for converting responses in the second format to the first format.

BRIEF DESCRIPTION OF THE DRAWINGS

The features of the present invention, which are believed to be novel, are set forth with particularity in the appended claims. The invention may best be understood by reference to the following description taken in conjunction with the accompanying drawings, in the several figures of which like reference numerals identify like elements, and in which:

DETAILED DESCRIPTION

While the present invention is susceptible of embodiments in various forms, there is shown in the drawings and will hereinafter be descried some exemplary and non-limiting embodiments, with the understanding that the present disclosure is to be considered an exemplification of the invention and is not intended to limit the invention to the specific embodiments illustrated.

The present system may be utilized in various network environments, as well as, systems such as automatic call distribution systems (ACD).

In some embodiments ITU-T Recommendation H.323 may be utilized as a protocol for call control in an interconnection network having network communication protocol like LAN, WAN or the Internet based on the IP networking technique. H.323 includes Q.931 protocol which is used as a call control signaling for establishing and releasing calls among terminal equipment and gateways in the internet, where the gateway is an equipment which interconnects between a call in the circuit switched network such as telephone networks, integrated services digital networks and mobile communication networks and a call in the internet. The network architecture in the H.323 includes a gatekeeper, which performs functions of address translation, access control, bandwidth management, etc. The gatekeeper may have additional functions relating to the call control such as a conference call control.

In many cases, a public switched telephone network is constructed as Intelligent Network (IN) in order to provide enhanced and diversified network service. The IN is a network connection architecture recommended in Q.1200 series of ITU-T. Difference between conventional network and the IN are two points of independence and integration of the service control function from the switching equipment.

An aim of the conventional telephone switching system is to efficiently provide one to one communication services. However, in order to provide the service control function to each switching equipment, complex addition and modification of the function are required. Therefore, advancing of services is somewhat limited. The IN solves this problem by constructing a layered structure such that the switching equipment executes a basic call connection function and dedicated information processing equipment executes a function for providing complex services. According to the IN, a service control function needed for realization, maintenance and operation of the network services is integrated and controlling, monitoring and managing of the call control part are performed so as to meet an introduction of advanced network services. Additional services such as freephone service, abbreviated dialing service, virtual private network service and transfer service are realized with the IN technique.

In a PBX and a private communication network composed mainly with dedicated line, these additional services are realized by adding a service control function to a server equipment connected to the PBX.

When a call from an information terminal C1 of the internet to a telephone terminal T1 of the telephone network arrive, the information terminal C1 inquires to the gatekeeper and the gatekeeper responds by retrieving a gateway address AG1 for the called telephone number NT1. Therefore, the gatekeeper has an address table to take the correspondence between the telephone number and the address of the gateway used to connect to the telephone number. The routing control can be thus performed by selecting the address of nearest gateway depending upon the called telephone number informed from the calling information terminal.

Wireless communications networks offer much flexibility to the user, in that they allow users of portable communications devices, such as personal digital assistants, laptop computers, telephones, and other appliances to get connected to the public switched telephone network from any location within the region served by the wireless network. Personal communication systems are known by which a user uses an RF link to communicate with an intelligent base station. Intelligent base stations provide radio access along with an Integrated Services Digital Network (ISDN) interface to the public switched telephone network (PSTN). The PSTN aspect of the system may have three components: a personal communications switching center, where telephone central office switches have certain characteristics, a signaling transfer point, and a service control point where an intelligent data base exists maintaining certain user features and records.

Systems are also known by which a wireless communications device such as laptop computer with a cellular modem may access a packet-switched (e.g., IP) data network such as a corporate backbone network or the Internet. In some systems, a frame relay line connected to the wireless network couples the remote wireless user to the packet-switched network via an all-digital network access server. This type of network access server is occasionally known in the art as an InterWorking Unit (IWU). The network access server provides an interface to the frame relay line and wireless network and an interface (including router functionality) to the packet switched network.

The mobile device typically dial into the IP network through a network access server or otherwise register with an InterWorking Unit or gateway router/home agent in order to gain access to the IP network and communicate with a remote terminal on the network.

Figure 1A:
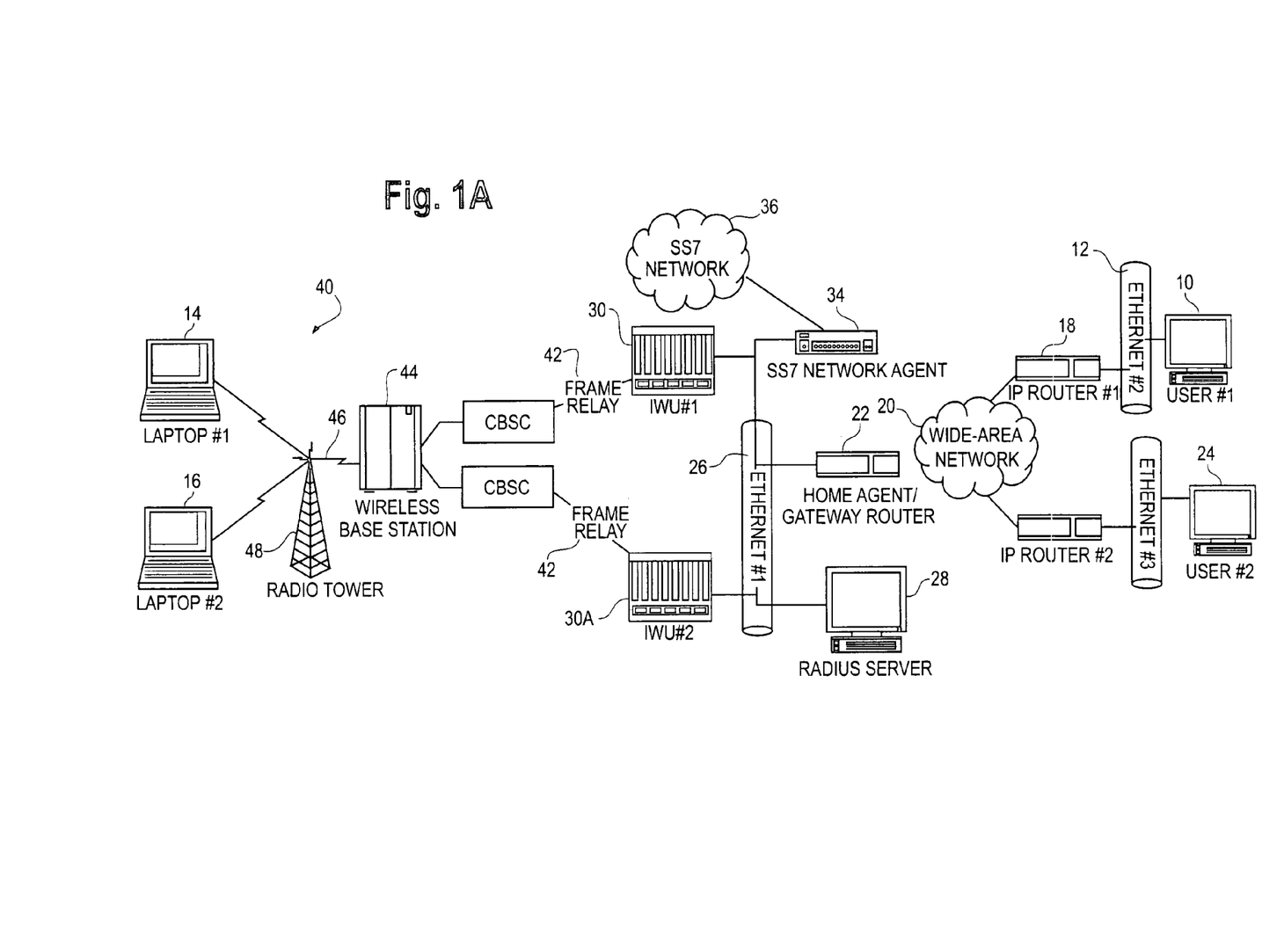
FIG. 1A is a schematic illustration of an example of a communications architecture that may be used to link a remote terminal on a packet-switched network and a user operating a mobile wireless communications device such as a laptop computer equipped with a cellular telephone modem, and in particular showing the relationship between the home agent, authentication server, a plurality of network access servers functioning as InterWorking Units that link the wireless communications network to an IP LAN and packet switched network, and Signaling System 7 network.
Figure 2:
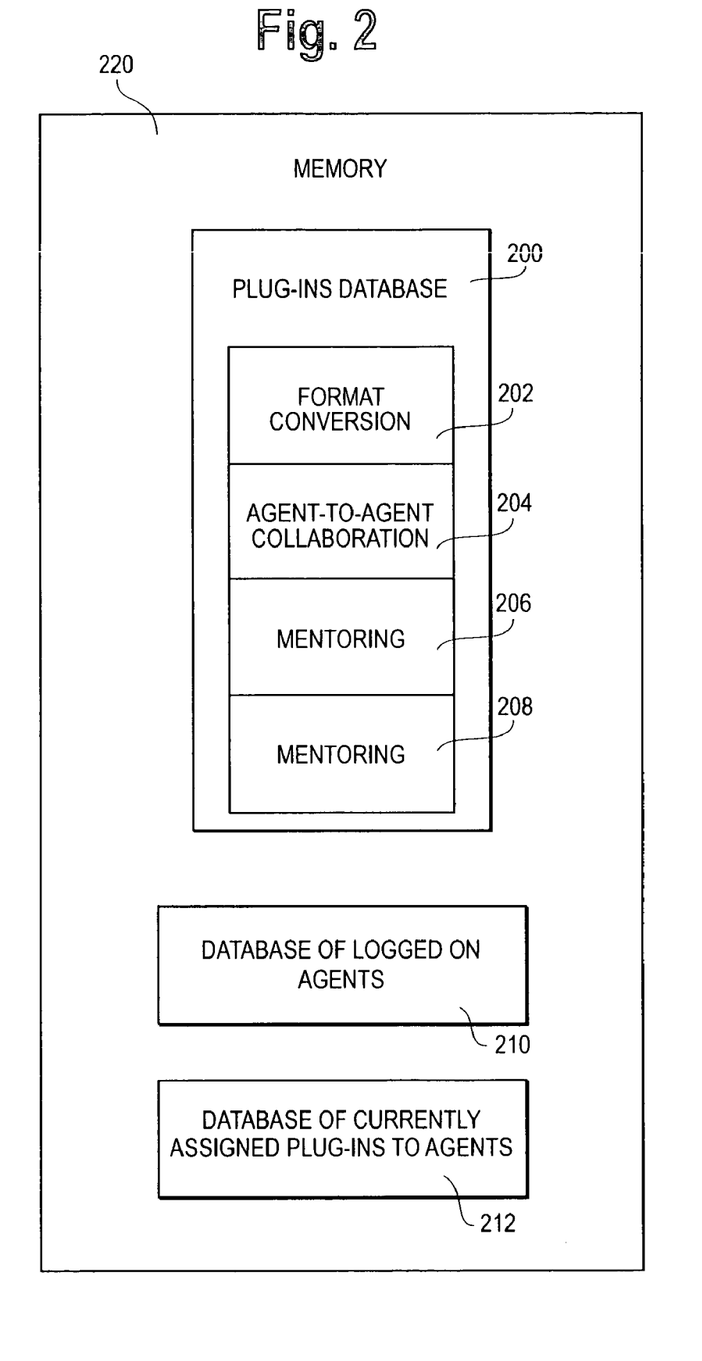
FIG. 2 is a depiction of an example databases stored in memory of an embodiment of the present invention.
Figure 2A:
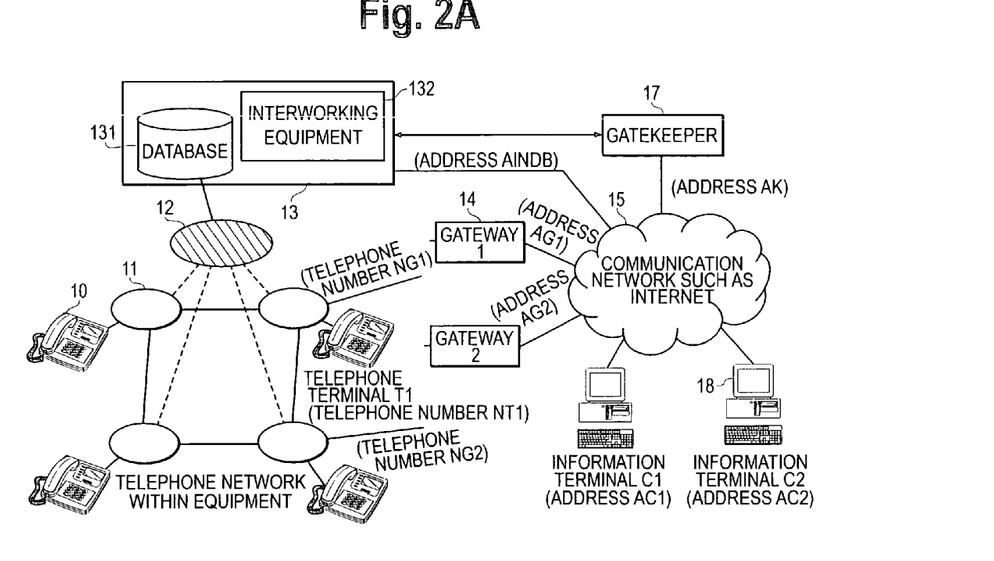
FIG. 2A is a schematic diagram of an embodiment of an interwork routing control system between a telephone network and the Internet as a preferred embodiment according to the present invention.

FIG. 2A is a schematic diagram of an interwork routing control system between a telephone network and the Internet. FIG. 1A is a schematic illustration of the communications architecture that may be used to link a remote terminal on a packet-switched network and a user operating a mobile wireless communications device such as a laptop computer equipped with a cellular telephone modem, and in particular showing the relationship between the home agent, authentication server, a plurality of network access servers functioning as InterWorking Units that link the wireless communications network to an IP LAN and packet switched network, and Signaling System 7 network.

FIG. 2A depicts an example of the system with a call control part 11 for performing basic connection of a circuit such as a digital switching system, a service control part 12 for directing the service to the call control part 11, and a service control information database 13 for storing service control information as shown.

A routing control communication system is connected between a telephone network and the Internet. In addition to the IN facility on the telephone network, a telephone terminal T1 provided with telephone number NT1 and a telephone terminal T2 provided with telephone number NT2 are depicted. A service control information database 131 and interworking equipment 132 are both shown as service database equipment 13. In the Internet 15, a gatekeeper 17 is provided with address AK, an information terminal C1 is provided with an address AC1 and an information terminal C2 is provided with an address AC2. Moreover, for connecting a telephone network and the Internet, a gateway 1 having a telephone number NG1 and an address AG1, and a gateway 2 having a telephone number NG2 and an address AG2 are shown.

Referring now to FIG. 1A, a situation may occur in which a user, for example, a person operating a personal computer 10 on a corporate backbone network 12, may wish to exchange information or data with one or more users of mobile wireless communications devices, such as the users operating laptop computer 14 or laptop computer 16. Similarly, the user of computer 24 may want to communicate with users operating laptop computer 14 or laptop computer 16. However, the users of the laptop computers 14 and 16, may desire to only communicate via text messages. For example, these users may be in a meeting or a conference where they cannot carry on a voice communication. Instead of the laptops 14 and 16 the users may only have text capable devices.

The wireless communications device 14 is a subscriber to a wireless communications network 40. If the device 14 is authenticated and authorized to receive the IP packet (i.e., is a current, paid up subscriber to the wireless network 40 service), a search is performed with a location server for an existing mobile IP address for routing the IP packet to the device. If the searching results in a negative outcome, the device 14 is paged via the wireless communications network 40. When the device 14 responds to the page, the device becomes connected to the IP network 20/12 of FIG. 1A via a network access server or InterWorking Unit (e.g., 30) coupling the wireless communications network 40 to the IP network 20/12. Thus connected, the device 14 may receive the IP packet and initiate communication via the IP network 20/12 with the source of the IP packet, terminal 10.

The backbone network 12 of the example of FIG. 1A comprises an IP local area network (such as an Ethernet network), which is coupled by an IP router 18 to a wide area IP network 20 such as the Internet. When the PC 10 destined for the laptop computer 14 generates an IP packet, the IP protocol requires a destination address field in the packet corresponding to the device 14. This address field will result in the call being forwarded over the IP network 20 to a home agent 22 for the device 14. The home agent 22 comprises a gateway/router, which may be a router on the IP network 20, which acts as mechanism for coordinating the receipt and transmission of communication sessions for the device 14 from multiple remote terminals, such as terminals 10 or 24. The home agent 22 also performs these functions for a plurality of mobile wireless communications devices, such as laptop computers 14 and 16.

The network access servers 30, and 30A may be coupled to a frame relay line 42 which is linked to a wireless base station 44 via a Central Base Station Controller (CBSC). Known and conventional additional equipment in the wireless network 40, such as mobile switching centers, may be present but are omitted from the illustration. The CBSCs multiplex a plurality of channels from multiple wireless devices on the frame relay line for transmission to the network access servers 30 and 30A. The wireless base stations transmits and receives data to and from the wireless devices via radio frequency links 46 to a radio tower 48 and radio frequency links from the tower 48 to the devices 14 and 16. The particular manner and details by which the wireless system 40 operates may be in any known manner.

The CBSC of the example system of FIG. 1A is maintained and operated by the provider of the wireless communication service for the mobile nodes 14 and 16. The CBSC multiplexes a plurality of calls (e.g., twenty three) onto an Integrated Services Digital Network Primary Rate Interface (ISDN PRI) T1 line and directs the data to the network access server 30. The CBSC also initiates a page of the mobile node 14, 16 over the wireless network 40 using a mobile switching center, base station 44 and a radio tower 48. The connection between the CBSC and the network access server 30 could also use some other technology such as Asynchronous Transfer Mode (ATM).

The SS7 network agent 34 is a known device, which is connected to the SS7 network on one side and the LAN on the other side. It maps messages received from the LAN side into SS7 messages to deliver to SS7 network elements, for example, a signaling transfer point, network control point or signal control point. The SS7 network has the ability much like a RADIUS server. It can authenticate using various attributes received in SS7 signaling message to access a database and authenticate a user to access the network. It can also deliver SS7 signaling messages to the home agent 22 on the LAN. The SS7 agent 34 thus allows the SS7 network to control a data network in addition to its current role, i.e., of controlling access to the worldwide public switched telephone network.

Figure 1:
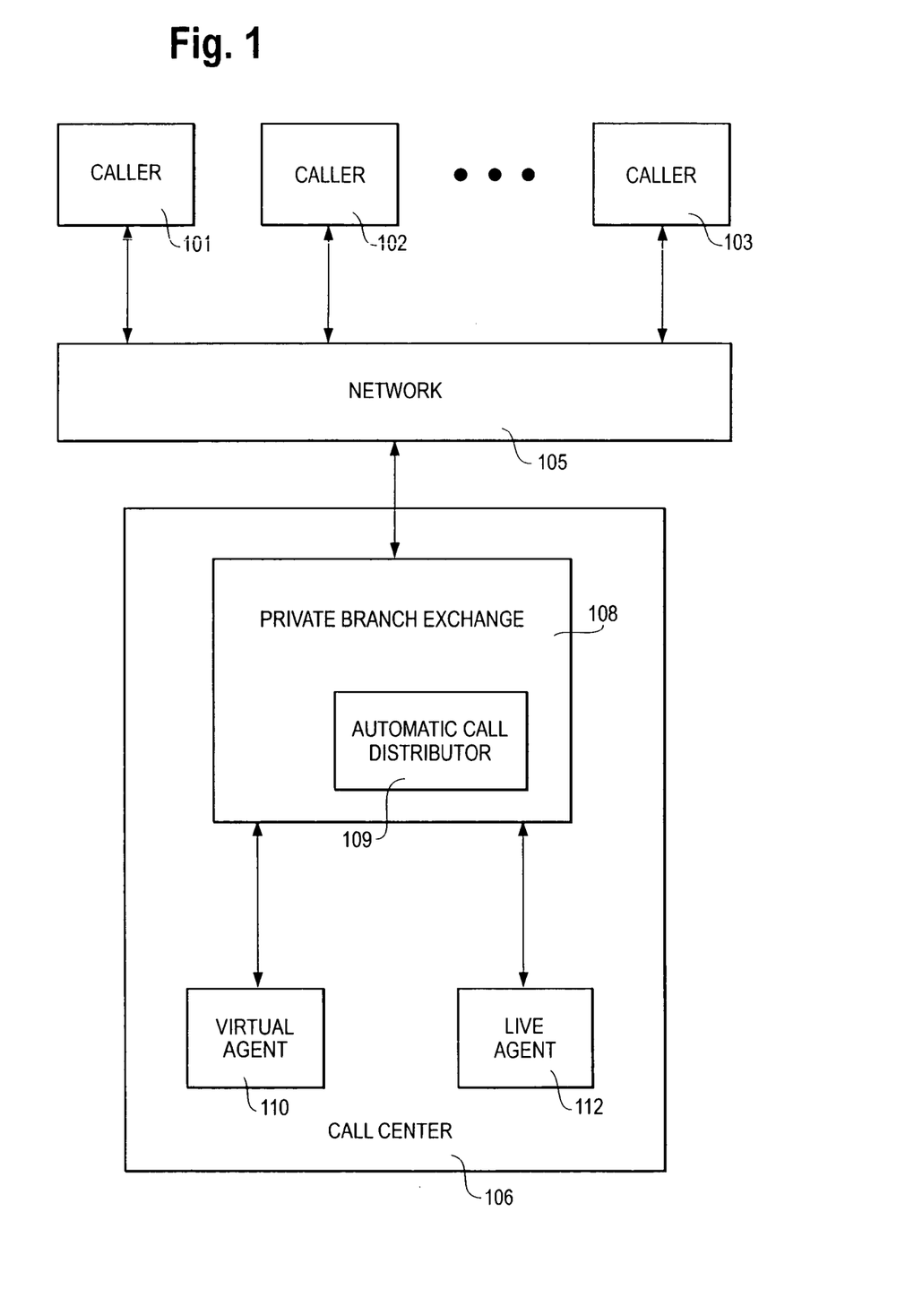
FIG. 1 is a general block diagram of one embodiment of a communication system.

FIG. 1 is a block diagram of a specific embodiment of a telephone system having an automatic call distributor 109 that is part of a private branch exchange 108 in a call center 106. Calls may be connected between callers 101, 102, 103 via a network 105 to an automatic call distributor 109. The automatic call distributor 109 may distribute the calls to telemarketers or agents, such as virtual agent 110, or live agent 112. The network 105 may be any appropriate communication system network such as a public switch telephone network, cellular telephone network, satellite network, land mobile radio network, the Internet, etc. Similarly, the automatic call distributor 109 may be a stand-alone unit, or may be integrated in a host computer, distributed among multiple computers, etc. The illustrated embodiment may be implemented under any of number of different formats. For example, where implemented in connection with a public switch telephone network, a satellite network, a cellular or land mobile radio network, the illustrated embodiment of FIG. 1 may operate within a host computer associated with the automatic call distributor and may receive voice information (such as pulse code modulation data) from a switched circuit connection which carries a voice between the callers 101, 102, 103 and the agents 110, 112.

An alternative embodiment, which may be implemented, for example, in connection with the Internet, may operate from within a server. Voice information may be carried between the agents 110, 112 and callers 101, 102, 103 using packets.

As shown in the embodiment of FIG. 1, a caller, such as caller 101, may place a call to the call center 106. The caller 101 typically uses a station set that may be, for example, embodied as a conventional telephone, videophone or personal computer configured with appropriate telephony software and Internet connectivity. The call is routed via the communication network 105 to the call center 106, in a conventional manner. The call in the illustrated embodiment may be routed within the call center 106 to the private branch exchange 108 that has the automatic call distributor 109. The private branch exchange switch 108 and the automatic call distributor 109 may comprise conventional hardware and software, as modified herein to carry out the desired functions and operations.

Generally, the private branch exchange switch 108 and the automatic call distributor 109 of the embodiment of FIG. 1 form a switching system designed to receive calls destined for the call center 106, and queue them when an appropriate agent is not available. In addition, the automatic call distributor 109 distributes calls to agents or specific groups of agents according to a prearranged scheme. The automatic call distributor 109 may be integrated with the private branch exchange 108, as in the illustrative embodiment shown in FIG. 1, or provided by a separate unit.

The telephone network 105, in the illustrated embodiment of FIG. 1 may include the combination of local and long distance wire or wireless facilities and switches known as the public switched telephone network, as well as cellular network systems and the telephony feature of the Internet. The telephone network 105 may be utilized to complete calls, for example, between (i) a caller at a station set, such as callers 101, 102, 103, and the call center 106; (ii) a caller on hold and a third party; and (iii) a caller on hold and a shared-revenue telephone service, such as a 900 or 976 service, provided by content provider. As is well known, shared-revenue telephone services deliver a particular service over the telephone and subsequently bill the caller. The telephone number from which a call is made typically identifies the caller. A subsequent bill is then included as part of the caller's regular telephone bill.

The Internet network, as used herein, includes the World Wide Web (the "Web") and other systems for storing and retrieving information using the Internet or other computer network. To view a web site, the user communicates an electronic Web address, referred to as a Uniform Resource Locator ("URL"), associated with the web site. It is noted that if the caller accesses the call center 100 from a conventional telephone, the textual portions of a premium web site may be converted to speech for presentation to the caller.

Embodiments of the system permit agents with disabilities/handicaps to function effectively in a transaction processing center environment. This addresses agents that may have visual, auditory, and vocal disabilities, and perhaps disabilities involving manual dexterity. This permits a caller to communicate with a disabled agent and permits the disabled agent to communicate with the caller by automatically translating the incoming and outgoing media into the appropriate format for the caller and the disabled agent, respectively.

The system, for example the automatic call distributor 109 (depicted in FIG. 1), typically may have a memory 220 as depicted in FIG. 2. The memory 220 may have a plug-in database 200, which may have plug-ins, such as the format conversion plug-in 202, as well as other plug-ins such as, agent-to-agent collaboration 204, mentoring 206, and monitoring 208. To increase ease of implementation, some format conversion plug-ins may convert to and from a common format (e.g. ASCII Text), thereby reducing the number of converters needed. The memory 220 also has a database of agents that are logged onto the system and is referred to as a database of logged-on agents 210. Furthermore, there is a database 212 of current agent assigned plug-ins.

Figure 3:
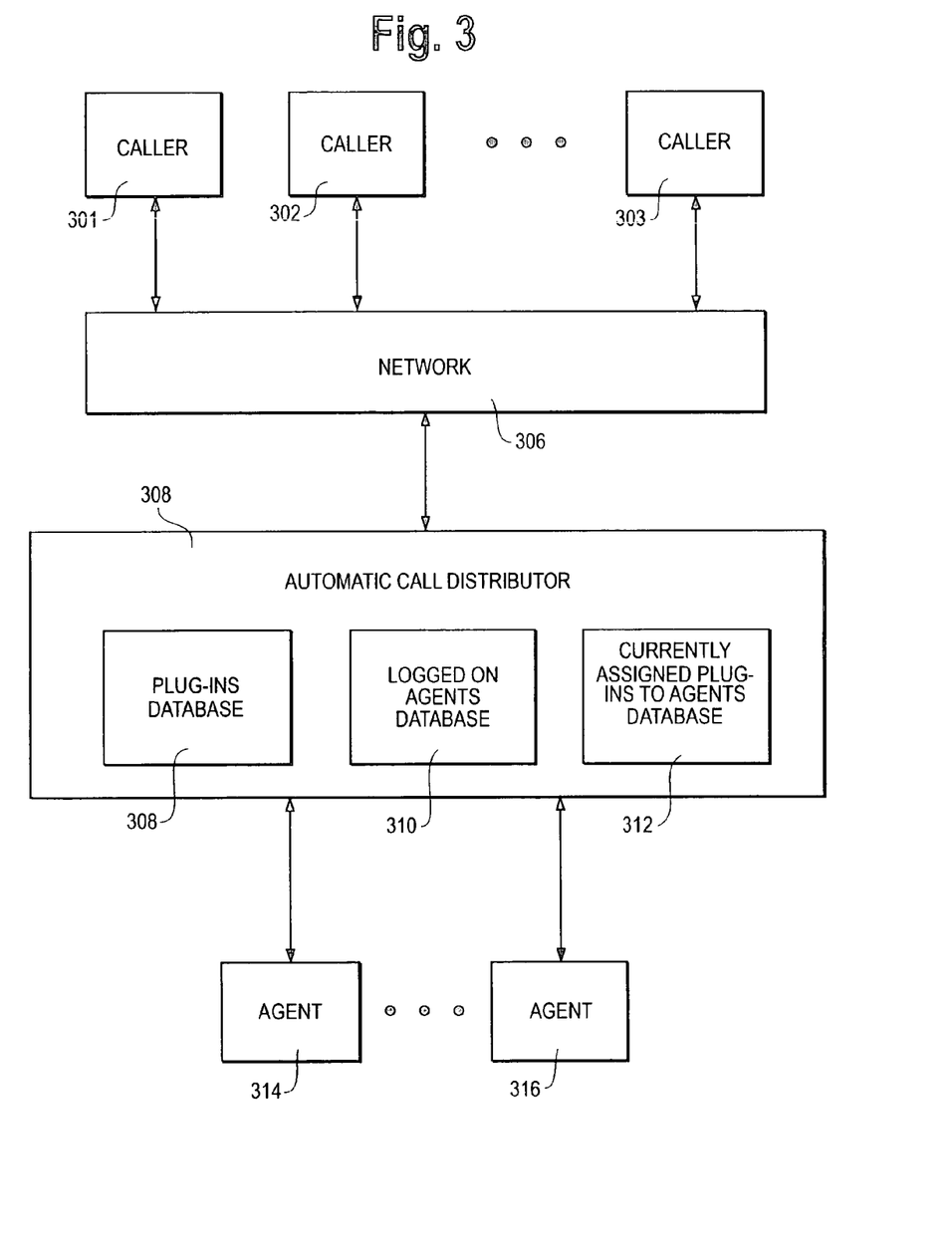
FIG. 3 is a block diagram showing more detail of an embodiment of the present invention.

In another embodiment depicted in FIG. 3, an automatic call distributor 306 connects one of the callers 301, 302, 303 via the network 305 to one of the agents 314, 316. The automatic call distributor 306 keeps track of the logged-on agents by the logged-on agents database 310. Initially, or periodically, or on an ongoing basis, agents may be assigned to the various plug-ins. This information may be stored in a currently assigned plug-in to agent database 312. In one embodiment, when one of the agents 314, 316 becomes available, that is, when the agent is not connected with a caller, the automatic call distributor 306 then accesses the plug-in database 308 and enables one of the pre-configured appropriate plugs-ins for this agent. For example, this agent may be handicapped and needs to use the format conversion plug-in 202. In another example, skill based routing may be implemented wherein the skill art would include the combination of training, abilities and the conversion abilities assigned to that agent. Thus, for example, the agent may have the ability to handle Spanish when converted to text.

The system translates communication into different formats or media to permit agents with handicaps or disabilities to function efficiently in the transaction processing center. First, the agent's requirements are evaluated and characterized so that an effective solution may be implemented. The solution provided is integrated into the ACD, and is not simply an "add-on" to the agent station computer. An agent's profile may contain an indication of a particular handicap.

Accordingly, the transaction processing system automatically translates the incoming media into the appropriate format for the agent to handle. Similarly, the agent's response is translated back into the format of the incoming call.

In very general terms the method is for converting messages and responses between different formats in a communication system. The method may have in one embodiment the following steps: providing at least one plug-in that implements at least one message format conversion in the communication system; assigning the at least one plug-in to one or more handicapped agents; and activating the at least one plug-in for the respective handicapped agent for converting received messages in a first format to a second format and optionally, for converting responses in the second format to the first format. The message may be, for example, one of an audio message, a text message, and a tactile message, and a response thereto may be one of an audio message, a text message and a tactile message. In one example, the format converter plug-in may convert voice to text or Braille, and may in some embodiments, convert text or Braille back into voice using known speech to text/Braille and text to speech modules.

In another embodiment the method is for converting messages and responses between different formats in an automatic call distribution system, the method having the steps of: providing a plurality of agents and a plurality of format conversion plug-ins; determining respective format conversion plug-ins of the plurality of format conversions for at least handicapped agents of the plurality of agents; assigning at least one respective plug-in to the a respective handicapped agent of the plurality of agents; receiving a message in a first format; identifying the first format of the message; selecting an agent from the plurality of agents to respond to the message; activating, when the selected agent is the respective handicapped agent, the at least one respective format conversion plug-in for the respective handicapped agent; converting the message from the first format to a second format; and providing the message in the second format to the respective handicapped agent. In a further embodiment the method may provide a response from the respective handicapped agent, the response being in the second format, the response being converted from the second format to the first format, and the response being sent in the first format.

Figure 4:
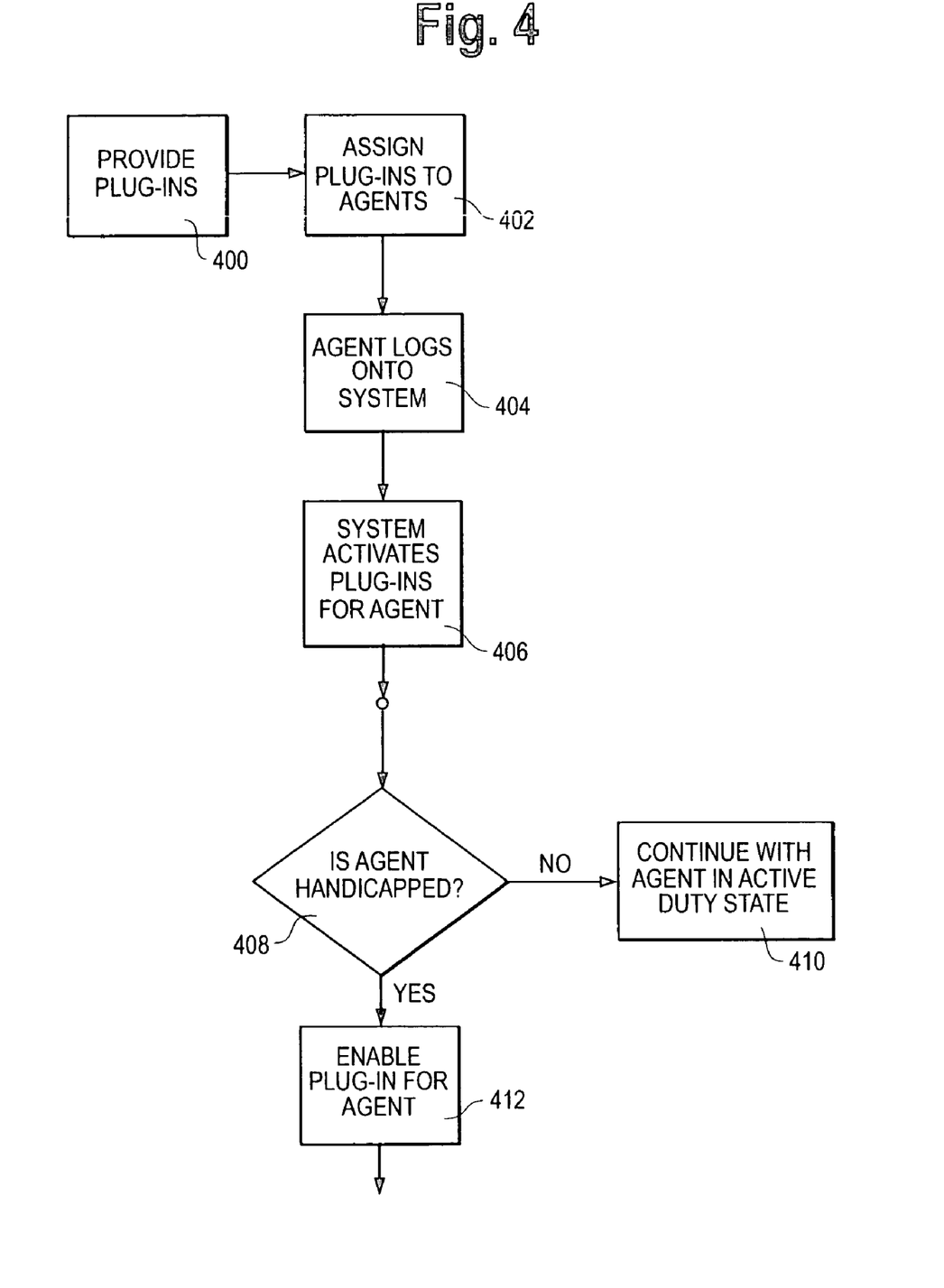
FIG. 4 is a flow diagram depicting one embodiment of a method of utilizing agents.

FIG. 4 is a flow diagram depicting one embodiment of a method of utilizing agents in which plug-ins are initially provided that implement at least one predetermined function in the call distribution system, or other communication systems as illustrated at step 400. Thereafter, the plug-ins are assigned to various agents in step 402. In step 404, the system keeps track of which agents are logged on to the system. The system activates plug-ins for an agent in step 406. Then in step 408, it is determined whether an agent is handicapped. If the agent is not handicapped, then according to step 410, the agent continues in the active duty state. If the agent is handicapped, then the plug-in for this agent is enabled in step 412.

In some embodiments, the automatic call distribution system has a plurality of agents and a plurality of plug-ins. Agents are then matched and assigned to at least one plug-in. Of course, it is to be understood that not all agents need to be assigned to plug-ins in the system, and that agents may be assigned to more than one plug-in. In a further embodiment, the plug-ins may be activated for a respective agent when the respective agent logs on to the system.

In one embodiment the apparatus, which converts messages and responses between different formats in a communication system, has the following elements: means for providing a plurality of agents and a plurality of format conversion plug-ins; means for determining respective format conversion plug-ins of the plurality of format means for conversions for at least handicapped agents of the plurality of agents; means for assigning at least one respective plug-in to the a respective handicapped agent of the plurality of agents; means for receiving a message in a first format; means for identifying the first format of the message; means for selecting an agent from the plurality of agents to respond to the message; means for activating, when the selected agent is the respective handicapped agent, the at least one respective format conversion plug-in for the respective handicapped agent; means for converting the message from the first format to a second format; and means for providing the message in the second format to the respective handicapped agent.

Figure 5:
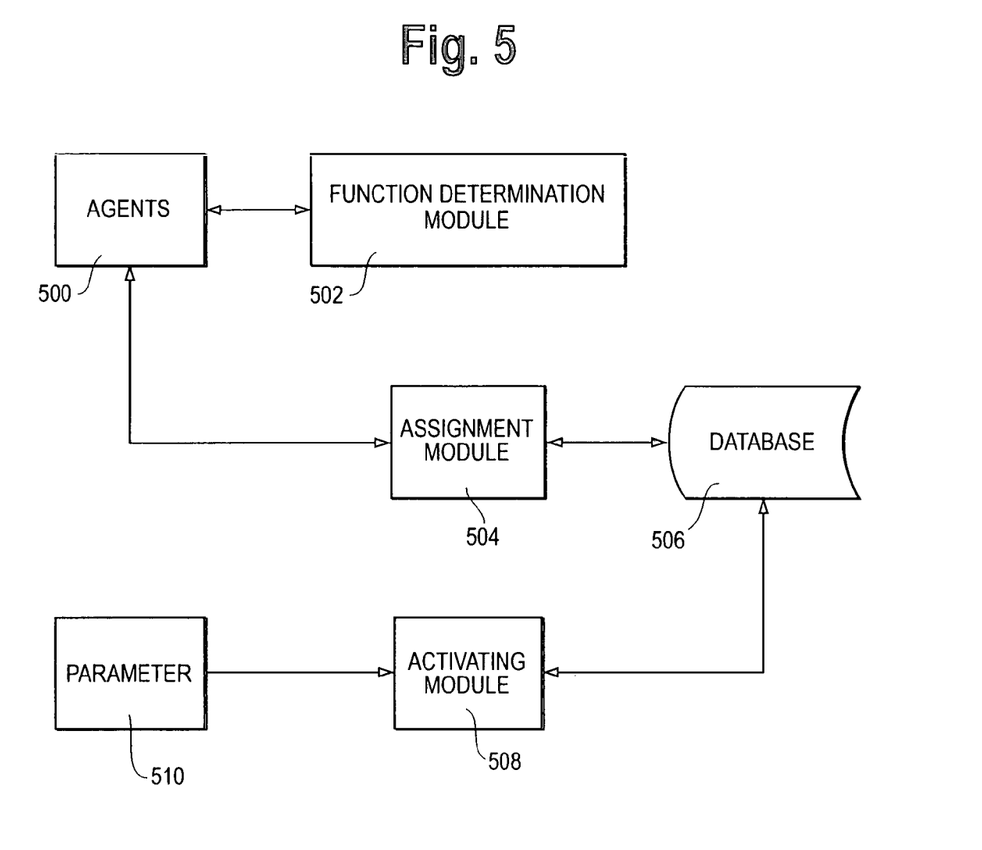
FIG. 5 is a block diagram depicting different modules in one embodiment of an exemplary call center system for utilizing agents.

FIG. 5 depicts the elements of one such embodiment. A function determination module 502 determines for a plurality of agents 500 respective agent functions for respective agents. An assignment module 504 is operatively connected to the determination module 502. This assignment module 504 assigns a respective agent function to a respective agent. The assignment module 504 also stores the assigned agent functions in a storage or database 506. An activating module 508 is operatively connected to the storage or database 506 and retrieves a respective agent function from the database 506, and activates the respective agent function for a respective assigned agent in response to at least one predetermined parameter (such as identification of a handicapped agent, see parameter 510) that occurs in the automatic call distribution system.

Figure 6:
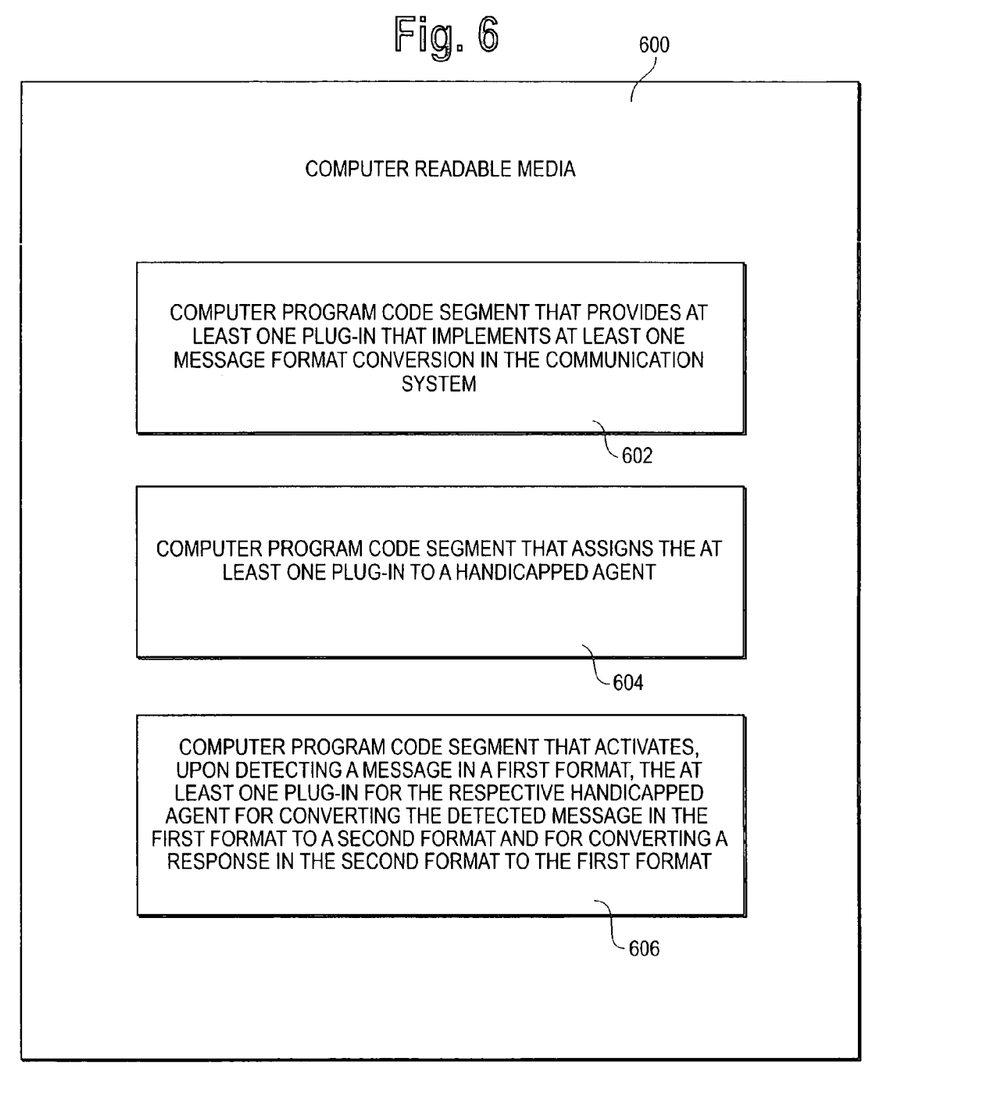
FIG. 6 is a computer readable media having computer program code segments for an exemplary example of a call center system for utilizing agents.

FIG. 6 depicts a computer readable media 600 that contains computer program code segments corresponding to the functions illustrated in FIG. 5. A first computer program code segment 602 provides at least one plug-in that implements at least one message format conversion in the communication system. A second computer program code segment 604 assigns the at least one plug-in to a handicapped agent. A third computer program code segment 606 activates, upon detecting a message in a first format, the at least one plug-in for the respective handicapped agent for converting the detected message in the first format to a second format and for converting a response in the second format to the first format.

The computer readable media may be any suitable storage medium including, but not limited to semiconductor RAM, ROM or flash memory, CD's, DVD's, paper tape, punch cards, and any optical, magnetic, and semiconductor recording mediums or the like.

It is to be understood, of course, that the present invention in the various embodiments can be implemented in hardware, software, or in combinations of hardware and software.

The present invention is not limited to the particular details of the apparatus and method depicted, and other modifications and applications are contemplated. Certain other changes may be made in the above-described apparatus and method without departing from the true spirit and scope of the invention herein involved. It is intended, therefore, that the subject matter in the above depiction shall be interpreted as illustrative and not in a limiting sense.

What is claimed is:

1. A method of converting messages and responses between different formats in a communication system, comprising:
   providing a plurality of agents;
   determining which of the agents are handicapped agents and their respective handicap;
   providing at least one plug-in that implements at least one message format conversion in the communication system;
   assigning the at least one plug-in to each handicapped agent based upon their respective handicap;
   selecting a handicapped agent to respond to a message; and
   activating a plug-in for the respective selected handicapped agent for converting received messages in a first format to a second format and for converting responses in the second format to the first format.

2. The method according to claim 1, wherein the communication system has a plurality of agents and a plurality of plug-ins, and wherein the method further comprises determining for a respective agent of the plurality of agents at least one plug-in, which is assigned to the respective agent.

3. The method according to claim 1, wherein the method further comprises the step of activating the at least one plug-in for the handicapped agent when the handicapped agent logs onto the communication system.

4. The method according to claim 1, wherein a message is one of an audio message, a text message, and a tactile message, and wherein a response is one of an audio message, a text message and a tactile message.

5. The method according to claim 1, wherein the communication system is an automatic call distribution system.

6. The method according to claim 1 wherein the at least one plug-in converts based upon a common format.

7. The method according to claim 1 wherein skills based routing to agents is used and the skill set comprises training, abilities and conversion abilities resulting from format conversion.

8. A method of converting messages and responses between different formats in an automatic call distribution system, comprising steps of:
   providing a plurality of agents and a plurality of format conversion plug-ins;
   determining which of the plurality of agents are handicapped agents;
   determining respective format conversion plug-ins of the plurality of format conversion plug-ins for the handicapped agents of the plurality of agents;
   assigning at least one respective format conversion plug-in to the respective handicapped agents of the plurality of agents;
   receiving a message in a first format;
   identifying the first format of the message;
   selecting an agent from the plurality of agents to respond to the message;
   activating, when the selected agent is the respective handicapped agent, the at least one respective format conversion plug-in for the respective handicapped agent;
   converting the message from the first format to a second format; and
   providing the message in the second format to the respective handicapped agent.

9. The method according to claim 8, wherein the method further comprises providing a response from the respective handicapped agent, the response being in the second format; converting the response from the second format to the first format; and sending the response in the first format.

10. The method according to claim 8, wherein the communication system is an automatic call distribution system, and wherein the method further comprises the step of activating respective plug-ins for a respective agent when the respective agent logs onto the automatic call distribution system.

11. The method according to claim 8, wherein a message is one of an audio message, a text message, and a tactile message, and wherein a response is one of an audio message, a text message and a tactile message.

12. The method according to claim 8, wherein the communication system is an automatic call distribution system.

13. The method according to claim 12 wherein the automatic call distribution system uses skill based routing and the skill set comprises conversion abilities resulting from format conversion.

14. A computer readable medium containing embedded computer program code for converting messages and responses between different formats in a communication system having a plurality of agents, the computer readable media containing computer program code segments comprising:
   a first computer program code segment that provides a plurality of plug-ins that each implement at least one message format conversion in the communication system;
   a second computer program code segment that determines which of the plurality of agents are handicapped agents and assigns respective plug-ins to respective handicapped agents based upon their respective handicap; and
   a third computer program code segment that, upon detecting a message in a first format, selects an agent and when the selected agent is a handicapped agent activates the respective plug-in for the respective handicapped agent for converting the detected message in the first format to a second format and for converting a response in the second format to the first format.

15. The computer program product according to claim 14, wherein a message is one of an audio message, a text message, and a tactile message, and wherein a response is one of an audio message, a text message and a tactile message.

16. The method according to claim 14, wherein the communication system is an automatic call distribution system.

17. An apparatus that converts messages and responses between different formats in a communication system, comprising:
   means for providing a plurality of agents and a plurality of format conversion plug-ins;
   selects an agent and activates when the selected agent is a handicapped agent,
   means for determining respective format conversion plug-ins of the plurality of format conversion plug-ins for the respective handicapped agents of the plurality of agents based upon each agent's respective handicap;
   means for assigning at least one respective format conversion plug-in to the respective handicapped agent of the plurality of agents;
   means for receiving a message in a first format;
   means for identifying the first format of the message;
   means for selecting an agent from the plurality of agents to respond to the message;

means for activating, when the selected agent is the respective handicapped agent, the at least one respective format conversion plug-in for the respective handicapped agent;

means for converting the message from the first format to a second format; and means for providing the message in the second format to the respective handicapped agent.

18. The apparatus according to claim 17, wherein the communication system is an automatic call distribution system.

19. The apparatus according to claim 17, wherein a message is one of an audio message, a text message, and a tactile message, and wherein a response is one of an audio message, a text message and a tactile message.

20. The apparatus according to claim 17 wherein the communication system routes calls to the agents based upon conversion abilities resulting from format conversion.

* * * * *